Sept. 6, 1932.   H. A. S. HOWARTH   1,876,234
COMBINED THRUST AND STEADY BEARING
Filed Nov. 3, 1928   3 Sheets-Sheet 1

Inventor
Harry A. S. Howarth.
By Cameron, Kerkam and Sutton.
Attorneys

Sept. 6, 1932.  H. A. S. HOWARTH  1,876,234
COMBINED THRUST AND STEADY BEARING
Filed Nov. 3, 1928  3 Sheets-Sheet 2
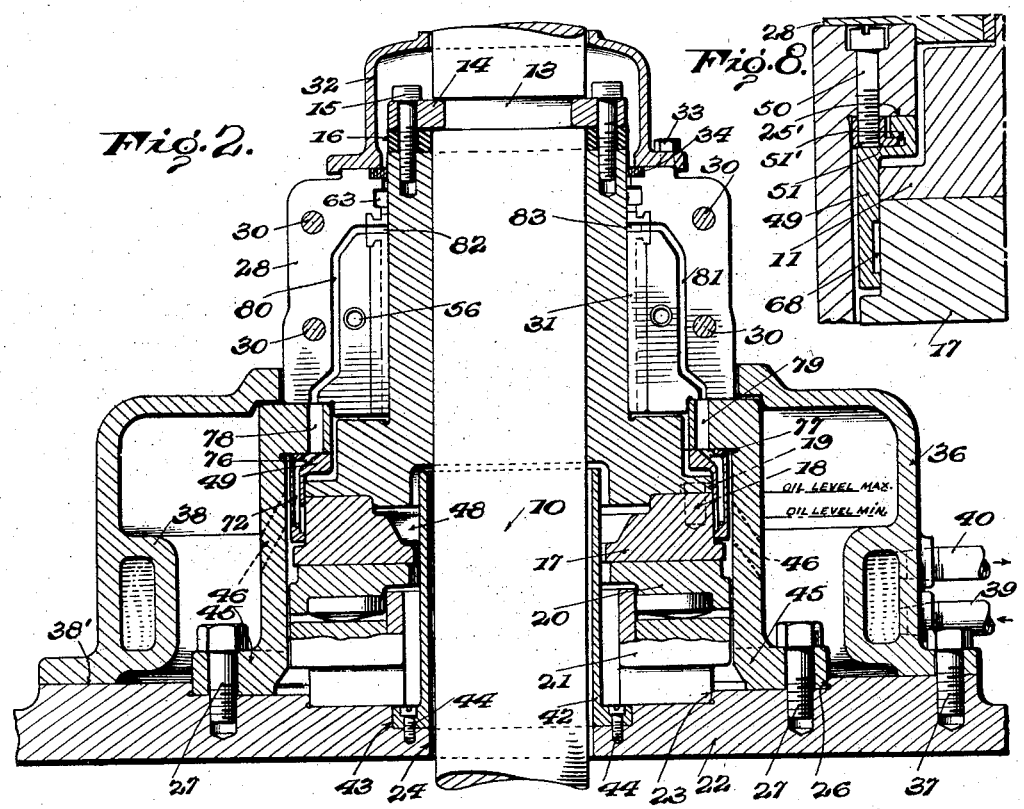
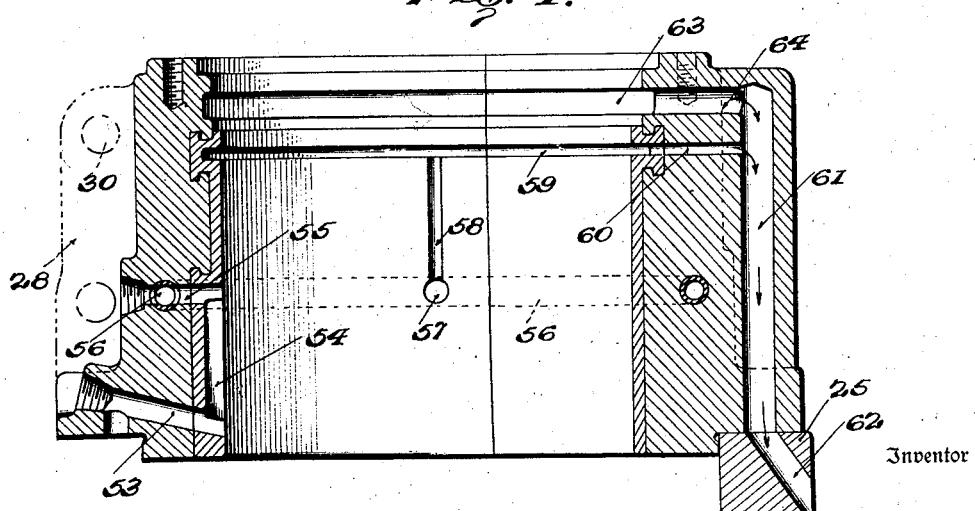

Sept. 6, 1932.    H. A. S. HOWARTH    1,876,234
COMBINED THRUST AND STEADY BEARING
Filed Nov. 3, 1928    3 Sheets-Sheet 3
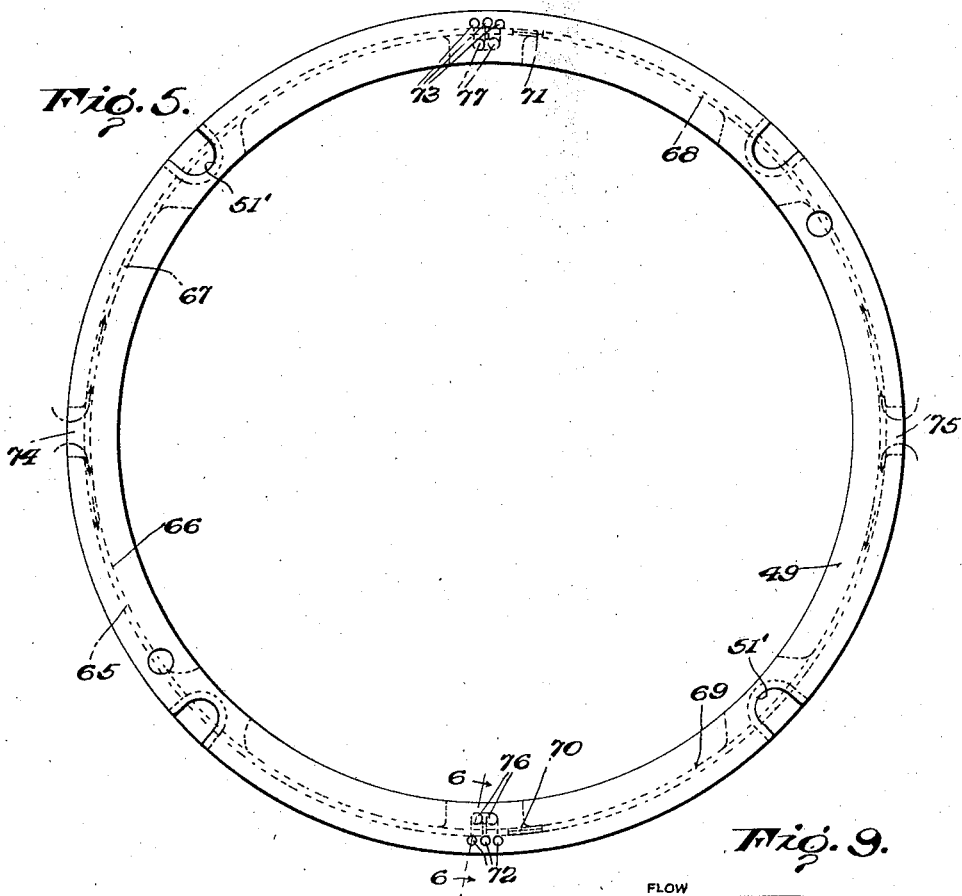
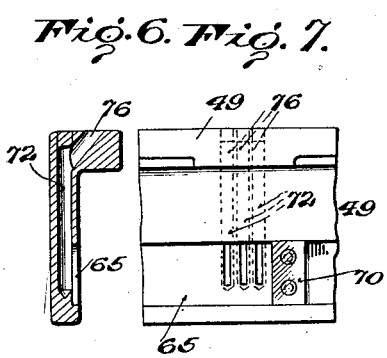
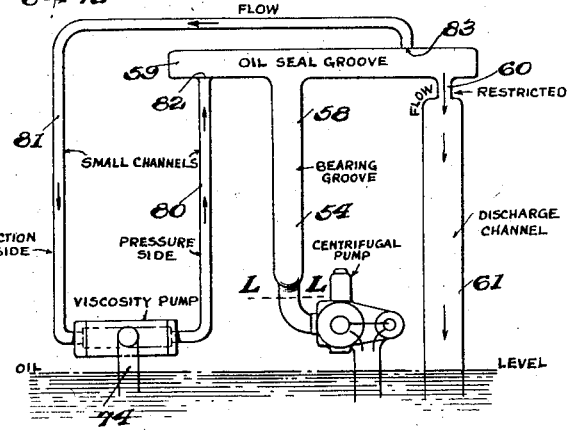
Inventor
Harry A. S. Howarth.
By Cameron, Kerkam and Sutton.
Attorneys Patented Sept. 6, 1932

1,876,234

UNITED STATES PATENT OFFICE

HARRY A. S. HOWARTH, OF FRANKFORD, PENNSYLVANIA, ASSIGNOR TO KINGSBURY MACHINE WORKS, INC., OF PHILADELPHIA, PENNSYLVANIA, A CORPORATION OF DELAWARE

COMBINED THRUST AND STEADY BEARING

Application filed November 3, 1928. Serial No. 317,002.

This invention relates to a combined thrust and steady bearing, and more particularly to a means for supplying lubricant to the bearing surfaces of the steady bearing.

In vertical thrust and steady bearings of the heavy duty type such as illustrated for instance in the co-pending application of Howarth, Serial No. 183,135, filed April 12, 1927, it has been proposed to immerse the thrust bearing elements in a pool of lubricant, and utilize the motion of the rotary thrust bearing member to circulate the lubricant between all the bearing surfaces. Since the steady bearing surfaces are located above the surface of the pool of lubricant, it is necessary to associate some form of pumping means with the rotary thrust bearing member to circulate the lubricant through the steady bearing, and the present invention embodies improved pumping and circulating means for that purpose.

Two types of pumping means which have been found to be generally satisfactory in service are the centrifugal type which utilizes the inertia of a confined body of oil rotated by the thrust member to generate the necessary pressure, and the viscosity type which relies on the frictional effect of a surface of the rotary thrust member on a confined body of oil to perform the same function. While both these types of pressure generating means perform satisfactorily under normal running conditions, it has been found that if the bearing is allowed to rotate slowly, as in a hydraulic turbine with leaking gates, the centrifugal pumping means does not satisfactorily generate sufficient pressure to lubricate the steady bearing. Viscosity pumps will operate at low rotative speeds, but if a bearing begins to run hot because of high speed or overload or for any other reason, the lubricant becomes thinner, and the effectiveness of a viscosity pump is reduced at the very time when an increased effectiveness would be desirable.

It is an object of the present invention to provide lubricant circulating means for a bearing of the type described which shall be effective under all operative conditions of the bearing.

It is another object of the invention to provide such a lubricant circulating means which utilizes the rotation of the thrust bearing member to maintain an adequate supply of lubricant to the steady bearing at low rotative speed, and to increase the supply at higher speed.

Another object of this invention is to provide a combined thrust and steady bearing for vertical shafts with novel means for lubricating the bearing surfaces which utilize the suction created by the rotation of the rotatable bearing member as well as the centrifugal action developed by the rotation of said member.

Another object of this invention is the provision of a combined thrust and steady bearing which embodies main and auxiliary lubricant supplying means, the auxiliary means being operative when the main supply means is inoperative.

Another object is the provision of force-feed lubricating means for a combined thrust and steady bearing which functions equally well in either direction of rotation, and which can be employed, if desired, without the use of valve mechanism of any kind.

Another object is the provision of such lubricating means in which thrusts caused by the pumping elements are at all times balanced with respect to the rotating parts of the bearing.

Another object of this invention is to provide a combined thrust and steady bearing for vertical shafts which includes novel lubricating means whereby oil may be supplied to the bearing members at a plurality of distributed points.

Another object of this invention is to provide lubricating means for the steady bearing of a combined thrust and steady bearing for vertical shafts, which is simple in construction, inexpensive to manufacture, easy to install, efficient in operation, and reliable and durable in service.

This invention is capable of receiving a variety of mechanical expressions one of which is shown in the accompanying drawings, but it is to be expressly understood that the drawings are for purposes of illustration only and are not to be construed as a definition of the limits of the invention, reference being had to the appended claims for that purpose.

Referring in detail to the drawings:

Fig. 2 is a vertical section of the same taken substantially on the line 2—2 of Fig. 3;

Fig. 4 is a vertical section of the stationary steady bearing member, taken substantially on the line 4—4 of Fig. 3;

Fig. 5 is a plan view of the viscosity pump ring member;

Fig. 6 is an enlarged vertical section of a portion of the viscosity pump ring taken substantially on the line 6—6 of Fig. 5;

Fig. 7 is an enlarged elevational detail of a portion of said ring;

Fig. 8 is an enlarged detail showing the method of mounting said ring; and

Fig. 9 is a diagrammatic showing of the lubricating system.

Figure 1:
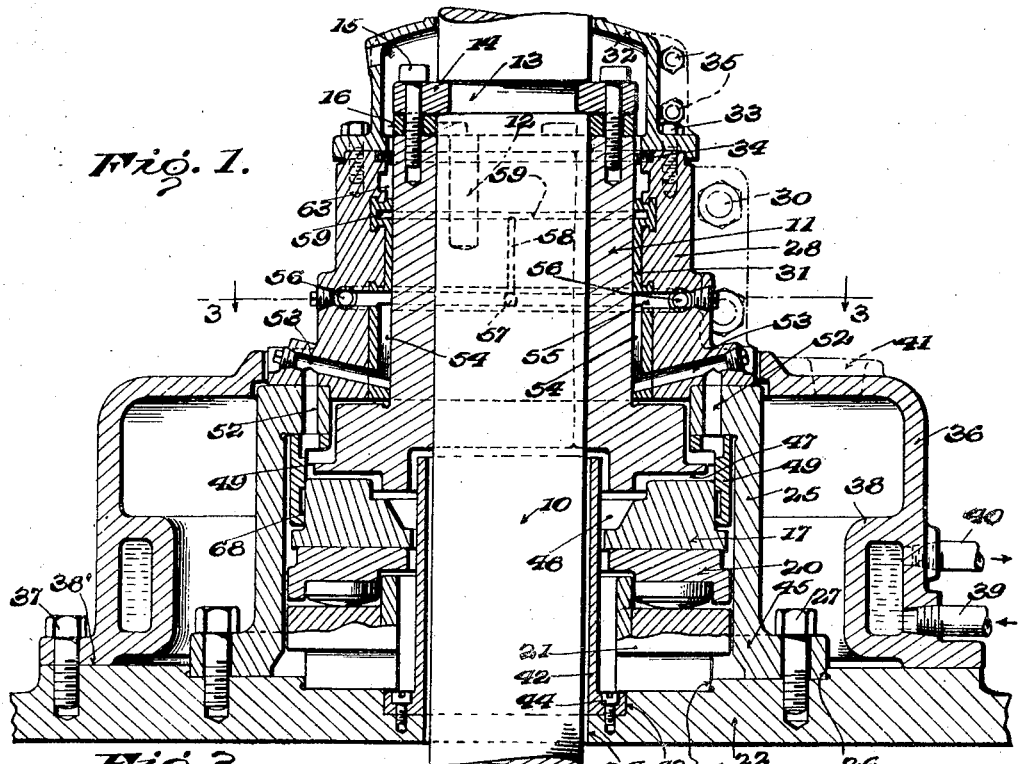
Fig. 1 is a vertical section through a combined thrust and steady bearing embodying the present invention, taken substantially on the line 1—1 of Fig. 3.

Referring to Fig. 1 of the drawings, numeral 10 indicates a vertical rotating shaft provided with a journal sleeve 11 suitably keyed thereon as by means of the key 12. Shaft 10 is provided with a circumferential groove 13, and a split ring 14 is fitted within said groove and is connected to the journal sleeve 11 by suitable means such as cap screws 15. A spacing ring 16 is interposed between the split ring 14 and the journal sleeve 11, the thickness of the spacing ring being arranged to properly position the journal sleeve 11 upon shaft 10.

The lower end of journal sleeve 11 is shown as formed as an adapter coupling to rest upon a rotating thrust bearing member or runner 17, relative rotation between the journal sleeve and runner being prevented by suitable means such as dowels 18 (Fig. 2) seated in the runner and engaging notches 19 in the bottom of the journal sleeve. The runner 17 is adapted to bear upon a series of stationary bearing shoes or segments 20 which are tiltably or flexibly mounted in any suitable way, being shown as carried on an equalizing structure 21 of known construction in such a manner that bearing pressures are equalized, and wedge-shaped films of oil are formed between the tilting shoes 20 and the runner 17 in the manner which is now well known in the art as the Kingsbury bearing principle. The equalizing structure 21 rests upon a deck 22 which serves as the support for the entire bearing assembly, the equalizing structure being suitably centered thereon as by engagement with a shoulder 23 on the surface of the deck member 22 concentric with an opening 24 through which the rotary shaft 10 extends.

Figure 3:
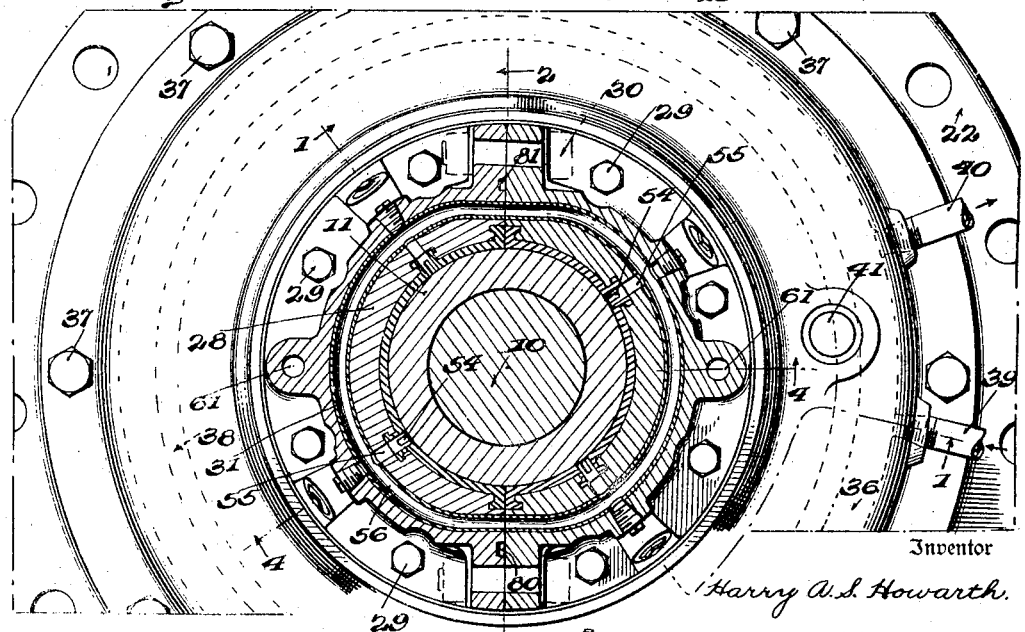
Fig. 3 is a horizontal section taken substantially on the line 3—3 of Fig. 1.

A cylindrical thrust casing member 25 is mounted upon the deck 22, centered thereon by suitable means such as the shoulder 26 on the deck, and suitably fixed thereto as by cap screws 27. The thrust casing 25 extends upwardly around the runner 17 and the lower end of the journal sleeve 11, and a steady bearing shell 28 is mounted on the upper end thereof, and suitably fixed thereto as by means of cap screws 29 (Fig. 3). The bearing shell 28 may be split as indicated in Figs. 2 and 3, the two halves being held in assembled relation by suitable bolts 30. The bearing shell 28 is provided with a suitable bearing lining 31 which is adapted to bear upon the journal sleeve 11, and a split cap member 32 is shown as fixed to the upper extremity of the shell 28 by suitable means such as cap screws 33, a packing ring 34 being retained between the inner edges of the shell and cap member, and serving to seal the upper end of the steady bearing. The two halves of the cap member 32 are held in assembled relation by any suitable means such as bolts 35.

A bell-shaped housing member 36 is mounted on the deck 22 concentrically with the opening 24 therein, and is fixed thereon by suitable means such as cap screws 37 in such a manner that the joint 38' between the housing 36 and deck 22 is oil tight. Housing 36 may be provided with a water jacket 38 formed integrally therewith, or suitably attached thereto, and provided with suitable threaded openings for inlet and outlet pipes 39 and 40. The housing member 36 is formed at its upper end to fit snugly about the lower end of the bearing shell 28, and may be provided with a suitable filler opening 41. A cylindrical oil-retaining member 42 is mounted in a recess 43 at the center of deck member 22, with its inner surface flush with the opening 24 therein and is held in oil-tight engagement therewith by suitable means such as cap screws 44. The oil-retainer 42 extends upwardly within the runner 17 and in close proximity thereto and to the shaft 10. Oil-retainer 42, deck 22, and housing 36 thus form together an oil reservoir in which oil is retained during the operation of the bearing at the levels indicated in Fig. 2. Suitable openings indicated at 45 and 46 are formed in the thrust casing 25 in order to allow the circulation of lubricant to and from the thrust bearing surfaces by the centrifugal action of the rotating runner 17.

The lower surface of the base of the journal sleeve 11 on the runner is provided in its lower surface with one or more horizontal or upwardly inclined outwardly extending grooves 47 which are preferably disposed in radial planes and which act as centrifugal pumps during the operation of the bearing and throw the lubricant outwardly from the annular space 48 within the runner 17. An annular member 49 is formed to fit snugly around the periphery of the runner 17 and is mounted within the thrust casing 25 by suitable means such as cap screws 50 and flanged nuts 51 (Fig. 8), the flanges of said nuts being interlocked with suitable recesses 51' in the ring so as to support the annulus against a shoulder 25' of thrust casing 25 while allowing slight lateral movement thereof to conform to the position of the runner 17 as determined by the steady bearing. Annulus 49 deflects the oil upwardly through vertical channels 52 in the thrust casing and bearing shell, from which the lubricant flows inwardly through channels 53 to the inner surface of the steady bearing 31. Vertically extending grooves 54 in the steady bearing 31 conduct the lubricant upwardly to approximately the central portion of said bearing, where radial conduits 55 connect these grooves with a circular conduit 56 in the bearing shell 28. The lubricant flows through conduit 56 to inwardly extending tubes 57 which lead to vertical grooves 58 in the steady bearing in staggered relation to grooves 54 and extending upwardly to a circumferential sealing groove 59. Groove 59 is provided with a pair of overflow outlets 60 (Fig. 4) of restricted dimensions, leading to return conduits 61 which conduct the lubricant back to the reservoir through oblique passages 62 in thrust casing 25. Oil which is forced out above the bearing 31 is collected in a circumferential groove 63 and returned to the conduits 61 through passages 64.

Referring now particularly to Figs. 2, 5, 6 and 7 of the drawings, it will be seen that means are also provided for cooperation with a suitable surface of the rotatable thrust bearing member and adapted to function as a viscosity pump to supply an additional quantity of lubricant to the steady bearing surfaces particularly when the rotation of shaft 10 is so slow that the centrifugal pumping means is incapable of generating sufficient pressure to supply an adequate quantity of lubricant to the bearing.

For this purpose the inner surface of the annulus 49, where it bears upon the runner 17, is provided with a circumferential channel 65. In order that the oil pressures generated within this pumping channel shall be balanced at all times, and that the pumping means may be equally effective in both directions of rotation of the runner 17, the channel 65 is divided in the form shown into a number of equal segments each of which constitutes a viscosity pump. In the present case four segments 66, 67, 68 and 69 are shown, the first two being active pumping means, and the last two being merely pressure generating means to balance the pressures set up by the opposite pumping segments. For this purpose dams 70 and 71 are interposed in the channel 65 to separate segments 68 and 69 from segments 66 and 67, and upwardly extending passages 72 and 73 are formed in the ring 49 leading from the segments 66 and 67 adjacent the dams 70 and 71. Openings 74 and 75 are formed in the ring 49 at the junctures of segments 66 and 67, and segments 68 and 69, in order to allow lubricant to flow into said segments. It will thus be seen that during clockwise rotation of the runner 17, as viewed in Fig. 5, the segments 67 will act as a pump and force lubricant entering the opening 74 upward through passages 73, and segment 69 will generate a balancing pressure from the lubricant trapped therein, while counterclockwise rotation of the runner will cause the segment 66 to pump oil entering opening 74 and force it out and upwardly through passages 72, while segment 68 generates a balancing pressure.

Openings 76 and 77 at the top of ring 49 connect the passages 72 and 73 with vertical passages 78 and 79, respectively (Fig. 2), through the upper end of the thrust casing 25. The radial surfaces of one-half of the bearing shell 28 are provided with grooves 80 and 81 which connect at their lower ends with said passages 78 and 79, and open into the sealing groove 59 at 82 and 83 respectively. Rotation of the runner 17 in either direction will thus cause oil to be supplied to the sealing groove 59 through one or the other of the grooves 80 or 81, depending upon the direction of rotation. The oil so supplied flows downward through the bearing grooves 58 and 54 until it meets the oil raised by the centrifugal pumping means and then through the centrifugal pumping means back to the reservoir.

The operation of the entire lubricating system will be best understood by reference to the diagrammatic showing in Fig. 9 of the drawings. During normal operation of the bearing, the centrifugal pump forces lubricant up through the bearing grooves 54, 58 to the sealing groove 59 and through the restricted overflow passage 60 to the discharge channel 61 and so back to the reservoir. If the rotation is counterclockwise, the viscosity pump is raising oil through the channel 80 and opening 82 into the oil seal groove 59, and oil is escaping through the opening 83 into the channel 81 where it is led back to the suction side of the viscosity pump. The pressure of the lubricant in the sealing groove 59 is regulated principally by the capacity of the centrifugal pump and by the size of the openings 60, 82 and 83.

Should the runner 17 be rotated at low speed, however, as may happen for instance in hydraulic installations in which the gates are not tight, the centrifugal pump becomes inoperative to supply the requisite lubricant. In this case lubricant from the pressure side of the viscosity pump enters the oil seal groove at 82 and flows down the bearing grooves 58 and 54 to the level L—L of the oil raised by the centrifugal pump at that speed, and returns to the reservoir by flowing back through the centrifugal pump.

If all the oil supplied at 82 by the pressure side of the viscosity pump does not pass down through the bearing grooves 58, 54, some must enter the passages 60 and 83. The lubricant which enters the passage 83 is drawn back through the conduit 81 to the suction side of the viscosity pump and is delivered at its inlet 74. That which enters the restricted outlet 60 passes down into the oil well through the discharge channel 61.

The level L—L produced by the centrifugal pump is determined by its speed. The position of this level with relation to the oil seal groove 59 determines the direction of flow of the oil through the bearing grooves 58, 54. When the level is above the sealing groove, the flow will be upward, and when it is below the groove the flow will be downward.

When the inlet 74 is arranged as shown in Fig. 5, the lubricant which is returned by the conduit 81 will partly or entirely pass directly into the pressure segment 66, depending upon the relative effectiveness of the two segments 66 and 67. The common inlet 74 may, of course, be divided to deflect the returning oil from the suction side of the pump if so desired.

When the shaft is reversed, since the passages 47 of the centrifugal pump are in radial planes, they will continue to raise the oil from the reservoir as before. The functions of the segments 66 and 67 of the viscosity pump will, however, be reversed, and the segment 67 will then become the pumping segment and segment 66 the return segment.

It will thus be seen that there is here provided a lubricant system for a combined thrust and steady bearing which is effective during all operating conditions of the bearings, irrespective of varying speeds of the bearings and varying temperatures of the lubricant, and without generating any unbalanced pressures in the bearings.

While but one embodiment of the invention has been shown and described in detail, it is to be understood that the invention is not restricted to such details, as various other embodiments will suggest themselves to persons skilled in this art, while changes may be made in the construction, arrangement and proportions of parts, and certain features used without other features, without departing from the spirit of the invention. Reference is therefore to be had to the claims hereto appended for a definition of the limits of the invention.

What is claimed is:

1. In a combined thrust and steady bearing, the combination of a rotatable thrust bearing member, means providing a body of oil in which said thrust bearing member is immersed, means associated with said rotatable thrust bearing member for developing centrifugal pressure in the oil for delivery to the bearing surfaces of the steady bearing, and means cooperating with said thrust bearing member whereby oil is forced to the bearing surfaces of the steady bearing by reason of the viscosity action developed by the rotation of said rotatable thrust bearing member.

2. In a combined thrust and steady bearing, the combination of a rotatable thrust bearing member, means providing a body of oil in which said thrust bearing member is immersed, means associated with said rotatable thrust bearing member for developing centrifugal pressure in the oil for delivery to the bearing surfaces of the steady bearing, and means cooperating with said thrust bearing member whereby oil is forced to spaced points of the bearing surfaces of the steady bearing by reason of the viscosity action developed by the rotation of said rotatable thrust bearing member.

3. In a combined thrust and steady bearing, the combination of a rotatable thrust bearing member, means providing a body of oil in which said thrust bearing member is immersed, separate oil passages from said rotatable thrust bearing member to the steady bearing surfaces, said rotatable thrust bearing member having means for developing centrifugal pressure in the oil for delivery to one of said passages, and means cooperating with said rotatable bearing member whereby oil is forced through the other of said passages to the steady bearing surfaces by reason of the viscosity action developed by the rotation of said rotatable thrust bearing member.

4. In a combined thrust and steady bearing, the combination of a rotatable thrust bearing member, means providing a body of oil in which said thrust bearing member is immersed, separate oil passages from said rotatable thrust bearing member to spaced portions of the steady bearing surfaces, said rotatable thrust bearing member having means for developing centrifugal pressure in the oil for delivery to one of said passages, and means cooperating with said rotatable thrust bearing member whereby oil is forced through the other of said passages to the steady bearing surfaces by reason of the viscosity action developed by the rotation of said rotatable thrust bearing member.

5. In a combined thrust and steady bearing, the combination of a rotatable thrust bearing member, means providing a body of oil in which said thrust bearing member is immersed, a steady bearing member, separate oil passages from said rotatable thrust bearing member to the steady bearing surfaces, said steady bearing having one or more grooves connecting said passages, said rotatable thrust bearing member having means for developing centrifugal pressure in the oil for delivery to one of said passages, and means cooperating with said rotatable thrust bearing member whereby oil is forced through the other of said passages to the steady bearing surfaces by reason of the viscosity action developed by the rotation of said rotatable thrust bearing member.

6. In a combined thrust and steady bearing, the combination of a rotatable thrust bearing member, means providing a body of oil in which said thrust bearing member is immersed, a steady bearing member, separate oil passages from said rotatable thrust bearing member to spaced portions of the steady bearing surfaces, said steady bearing having one or more grooves connecting said passages, said rotatable thrust bearing member having means for developing centrifugal pressure in the oil for delivery to one of said passages, and means cooperating with said rotatable thrust bearing member whereby oil is forced through the other of said passages to the steady bearing surfaces by reason of the viscosity action developed by the rotation of said rotatable thrust bearing member.

7. In a combined thrust and steady bearing for vertical shafts, a rotating thrust bearing member having outwardly directed passages and a smooth peripheral surface, a stationary steady bearing shell associated with the thrust bearing member, means supplying a body of lubricant in which the thrust bearing is immersed, said stationary bearing shell having means cooperating with the outwardly directed passages of the thrust bearing member to supply oil to the steady bearing at high rotative speeds, and means cooperating with the smooth peripheral surface of the thrust bearing member to supply oil to the steady bearing at low rotative speed.

8. In a combined thrust and steady bearing for vertical shafts, a rotating thrust bearing member having outwardly directed passages and a smooth peripheral surface, a stationary steady bearing shell associated with the thrust bearing member, means supplying a body of lubricant in which the thrust bearing is immersed, said stationary bearing shell having means cooperating with the outwardly directed passages of the thrust bearing member to supply oil to the steady bearing at high rotative speeds, and a viscosity pump ring cooperating with the rotating thrust bearing member to supply oil to the steady bearing at low rotative speeds.

9. In a combined thrust and steady bearing for vertical shafts, a rotating thrust bearing member having outwardly directed passages and a smooth peripheral surface, a stationary steady bearing shell associated with the thrust bearing member, means supplying a body of lubricant in which the thrust bearing is immersed, said stationary bearing shell having means cooperating with the outwardly directed passages of the thrust bearing members to supply oil to the steady bearing at high rotative speeds in either direction, and a viscosity pump ring floatingly mounted and cooperating with the rotatable thrust bearing member to supply oil to the steady bearing at low rotative speeds in either direction.

10. In a combined thrust and steady bearing for vertical shafts, relatively rotatable steady bearing members and separate sources of lubricant supply connected to the ends of the steady bearing.

11. In a combined thrust and steady bearing for vertical shafts, relatively rotatable steady bearing members, a high speed source of lubricant supply connected to one end of said bearing, and a low speed source of lubricant supply connected to the other end.

12. In a combined thrust and steady bearing for vertical shafts, a steady bearing member having a lubricant groove in its surface, and separate sources of lubricant supply connected to the ends of said groove.

13. In a combined thrust and steady bearing for vertical shafts, a steady bearing member having a lubricant groove in its surface, a high speed lubricant supply means connected to one end of the groove, and a low speed lubricant supply means connected to the other end of the groove, the direction of flow of the lubricant in the groove depending on the relative activity of the supplying means.

14. In a combined thrust and steady bearing for vertical shafts, a steady bearing member having a lubricant groove in its surface, a centrifugal lubricant supplying means connected to one end of the groove, and a viscosity lubricant supplying means connected to the other end of the groove, the direction of flow of lubricant in the groove depending upon the relative activity of the supplying means.

15. In a combined thrust and steady bearing, lubricating means for the steady bearing comprising centrifugal pumping means, viscosity pumping means, and conduits from each pumping means to spaced points on the steady bearing.

16. In a combined thrust and steady bearing, lubricating means for the steady bearing comprising centrifugal pumping means, viscosity pumping means, conduits from each pumping means to spaced points on the steady bearing, and a restricted outlet for surplus oil from said steady bearing.

17. In a combined thrust and steady bearing, lubricating means for the steady bearing comprising centrifugal pumping means, viscosity pumping means, conduits from each pumping means to the opposite ends of the steady bearing surfaces, grooves connecting said conduits, and a restricted outlet for surplus oil from said steady bearing.

18. In a combined thrust and steady bearing, lubricating means for the steady bearing comprising centrifugal pumping means, viscosity pumping means, and conduits from each pumping means to the opposite ends of the steady bearing surface so arranged that when either pump is inoperative, lubricant from the other pump flows through the steady bearing and out through the inoperative pump.

19. In a combined thrust and steady bearing for vertical shafts, a steady bearing member having an oil sealing groove at its upper end, means for delivering oil under pressure to the lower end of the steady bearing, and means for delivering a supply of oil to the sealing groove.

20. In a combined thrust and steady bearing for vertical shafts, a steady bearing member having an oil sealing groove at its upper end, high speed means for delivering oil under pressure to the lower end of the steady bearing, and low speed means for delivering a supply of oil to the sealing groove.

21. In a combined thrust and steady bearing for vertical shafts, a steady bearing member having an oil sealing groove at its upper end, centrifugal pumping means for delivering oil under pressure to the lower end of the steady bearing, and viscosity pumping means for delivering a supply of oil to the sealing groove.

22. In a combined thrust and steady bearing for vertical shafts, a steady bearing member having an oil sealing groove at its upper end, automatic means operative in either direction of rotation of the shaft for delivering oil under pressure to the lower end of the steady bearing, and automatic means operative in each direction of rotation for delivering a supply of oil to the sealing groove, said groove having a restricted overflow outlet.

23. In a combined thrust and steady bearing for vertical shafts, a steady bearing member having an oil sealing groove at its upper end, high speed automatic means operative in either direction of rotation of the shaft for delivering oil under pressure to the lower end of the steady bearing, and low speed automatic means operated in each direction of rotation for delivering a supply of oil to the sealing groove, said groove having a restricted overflow outlet, and each delivery means serving when inoperative as an additional outlet.

24. A viscosity pump ring comprising a plurality of segments, a plurality of which are selectively active in each direction of rotation.

25. A viscosity pump ring comprising a plurality of segments opposite pairs of which are simultaneously active to produce balanced pressures.

26. A viscosity pump ring comprising a plurality of segments some of which are selectively active in each direction of rotation, opposite pairs of said segments being simultaneously active.

27. A viscosity pump ring comprising a plurality of segments opposite pairs of which are simultaneously active, one segment of each pair being arranged to pump lubricant in one direction of rotation and the other being arranged to simultaneously generate a balancing pressure.

28. A viscosity pump ring comprising active quadrants, one pair of adjacent quadrants having a common opening to the oil supply and separate discharge passages, and the other pair having a common supply opening but no discharge passages.

29. In a combined thrust and steady bearing, a rotatable thrust bearing member, viscosity pumping means cooperating therewith in either direction of rotation to supply lubricant to the steady bearing surfaces, and means for balancing the thrust of the pumping means on the rotatable thrust bearing member.

30. In a combined thrust and steady bearing, a rotatable thrust bearing member, viscosity pumping means and centrifugal pumping means cooperating therewith in either direction of rotation to supply lubricant to the steady bearing surfaces.

31. In a combined thrust and steady bearing, a rotatable thrust bearing members, viscosity pumping means and centrifugal pumping means cooperating therewith in either direction of rotation to supply lubricant to the steady bearing surfaces and means for balancing the thrust of the pumping means on the rotatable thrust bearing member.

32. In a combined thrust and steady bearing for vertical shafts, a stationary steady bearing member having an oil sealing groove at its upper end, automatic means operative in either direction of rotation of the shaft for delivering oil under pressure to the lower end of the steady bearing, and automatic means operative in each direction of rotation for delivering a supply of oil to the sealing groove.

33. In a combined thrust and steady bearing, a rotatable thrust bearing member, means providing a body of oil in which said member is immersed, means cooperating with said rotatable thrust bearing member whereby oil is supplied to the steady bearing by the centrifugal action of said rotatable thrust bearing member, and a viscosity pump cooperating with said rotatable thrust bearing member and adapted to supply oil to the steady bearing when said centrifugal means is ineffective.

34. In a combined thrust and steady bearing, a rotatable thrust bearing member, means providing a body of oil in which said member is immersed, a steady bearing member, means cooperating with said rotatable thrust bearing member whereby oil is supplied to said steady bearing member by centrifugal action, and a viscosity pump cooperating with said rotatable thrust bearing member and adapted to deliver oil to said steady bearing member so as to flow with respect thereto in the opposite direction from that of the oil supplied by centrifugal action.

35. A combined thrust and steady bearing comprising relatively rotatable bearing members, means providing a body of oil for cooperation with the rotatable thrust bearing member, and means cooperating with said last named bearing member for supplying oil to the steady bearing member and including a plurality of means differentially operable at different speeds for supplying oil at all times to the steady bearing members.

36. A combined thrust and steady bearing comprising relatively rotatable bearing members, means providing a body of oil for cooperation with the rotatable thrust bearing member, and means cooperating with said last named bearing member for supplying oil to the steady bearing member and including means respectively operating by reason of centrifugal force and the viscosity of the oil for delivering oil at different speeds to the steady bearing members.

37. A combined thrust and steady bearing comprising relatively rotatable bearing members, means providing a body of oil for cooperation with the rotatable thrust bearing member, and means cooperating with said last named bearing member for supplying oil to the steady bearing member and including a reversible system having separate means at the respective ends of the system tending to pump oil thereinto and differently effective at different speeds.

38. A viscosity pump ring including chambers effective to pump oil for either direction of rotation and opposite chambers effective for either direction of rotation to balance the pressure generated in the active pumping chamber.

39. A combined thrust and steady bearing comprising relatively rotatable bearing members, means providing a body of oil for cooperation with the rotatable thrust bearing member, and means cooperating with said last named bearing member for supplying oil to the steady bearing member and including means for supplying oil to the steady bearing at normal speeds and supplemental oil supplying means automatically operative to maintain the supply of oil to the steady bearing when the speed is reduced below that at which said first named means is sufficiently effective.

In testimony whereof I have signed this specification.

HARRY A. S. HOWARTH.